United States Patent [19]

Yoshieda et al.

[11] 4,381,593
[45] May 3, 1983

[54] METHOD AND APPARATUS FOR APPLYING TOP END STOPS TO A FASTENER STRINGER CHAIN

[75] Inventors: Keiichi Yoshieda; Yoshitaka Iimura, both of Kurobe, Japan

[73] Assignee: Yoshida Kogyo K.K., Tokyo, Japan

[21] Appl. No.: 288,939

[22] Filed: Jul. 31, 1981

[30] Foreign Application Priority Data

Aug. 13, 1980 [JP] Japan .............................. 55-111344

[51] Int. Cl.³ .................. B29D 5/00; A41H 37/06
[52] U.S. Cl. .................................... 29/408; 29/767
[58] Field of Search .............. 29/408, 409, 766, 767, 29/768; 24/205.11 R, 205.11 F; 264/252, 23; 425/814

[56] References Cited

U.S. PATENT DOCUMENTS

| | | | |
|---|---|---|---|
| 3,340,594 | 9/1967 | Frönlich | 29/408 |
| 3,818,575 | 6/1974 | Johnston et al. | 29/408 |
| 4,110,890 | 9/1978 | Akashi | 29/408 |
| 4,190,944 | 3/1980 | Yoshida et al. | 29/408 |
| 4,190,945 | 3/1980 | Yoshida et al. | 29/408 |
| 4,265,014 | 5/1981 | Yoshieda et al. | 29/767 |
| 4,309,233 | 1/1982 | Akashi | 29/408 |

Primary Examiner—Ervin M. Combs
Assistant Examiner—Steven E. Nichols
Attorney, Agent, or Firm—Hill, Van Santen, Steadman, Chiara & Simpson

[57] ABSTRACT

There is disclosed an apparatus for applying top end stops to a fastener stringer chain substantially in a continuous cycle of operation, wherein a first means is provided to effect the fusing and shaping of a strip of plastic film for application to the chain and a second means is provided to effect the cutting of the chain to which the film strip has been applied in the form of a top end stop. Said first and second means are arranged so that both shaping and cutting take place at the same working station without having to transfer the chain for the two different operations.

6 Claims, 9 Drawing Figures

METHOD AND APPARATUS FOR APPLYING TOP END STOPS TO A FASTENER STRINGER CHAIN

BACKGROUND OF THE INVENTION

1. Field of the Invention

This invention relates to an apparatus for applying top end stops to a slide fastener stringer chain carrying rows of coupling elements of a continuous type structure. More particularly, the invention is concerned with apparatus for effecting such top end stop application substantially in a continuous cycle of operation.

2. Prior Art

There have been proposed numerous methods for applying top end stops to continuous lengths of slide fastener stringers. A typical example of such conventional methods comprises fusing a strip or film of plastic material together with coupled rows of fastener elements on a pair of stringers, shaping the material into a periphery of desired form and cutting the stringers along the shaped top end stops. This prior art method involves the necessity of moving the stringer chain to a cutting station subsequently to the formation of top end stops thereon, in which instance a high degree of accuracy is required to bring and hold an intended cut-line of a given length of the stringer chain in registry with a cutter blade. However, doing so has been difficult on account of the tendency of the stringer tape to stretch or shrink, coupled with the fact that the strip of formed plastic material is very small. Furthermore, it has been necessary to install a cutting machine separately from a shaping machine, which in turn required additional floor space, complicated mechanical structures and extra time due to the need for moving and repositioning the stringer chain upon formation of top end stop strips.

SUMMARY OF THE INVENTION

The present invention is aimed at the provision of a novel apparatus for applying top end stops to a fastener stringer chain at a maximum of efficiency and accuracy.

More specifically, the invention provides a novel apparatus which can accomplish the fusing, shaping and cutting of top end stops all at a single station and which therefore involves a minimum of space and time consumption.

These and other objects and features of the invention will be better understood from the following detailed description taken in connection with the accompanying drawings.

Briefly stated, the present invention provides an apparatus for applying top end stops to a fastener stringer chain characterized by the arrangement wherein means for fusing and shaping a strip of film material and means for subsequently cutting the chain along the shaped strip are both accommodated within a common housing and driven relatively to each other by a common actuating means.

DETAILED DESCRIPTION OF THE PREFERRED EMBODIMENT

Figure 1:
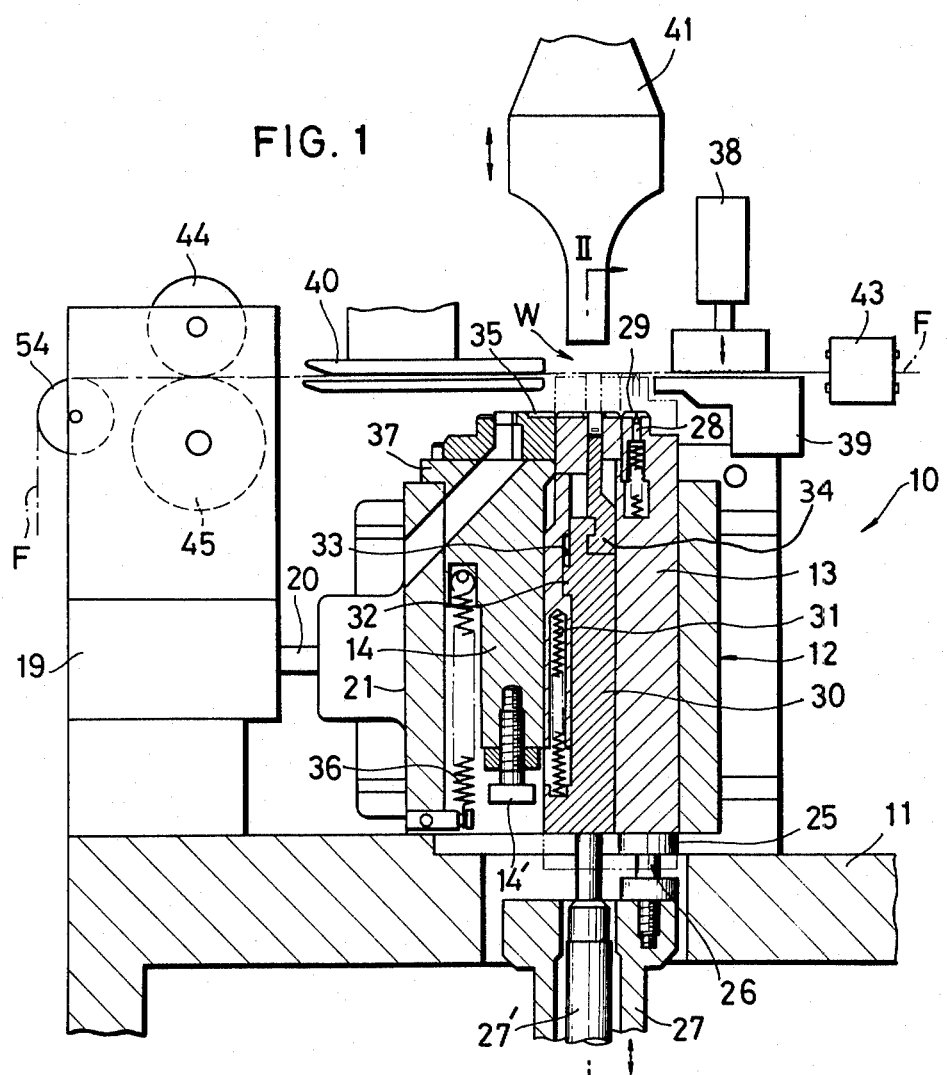
FIG. 1 is a vertical cross-sectional view of an apparatus embodying the invention.
Figure 2:
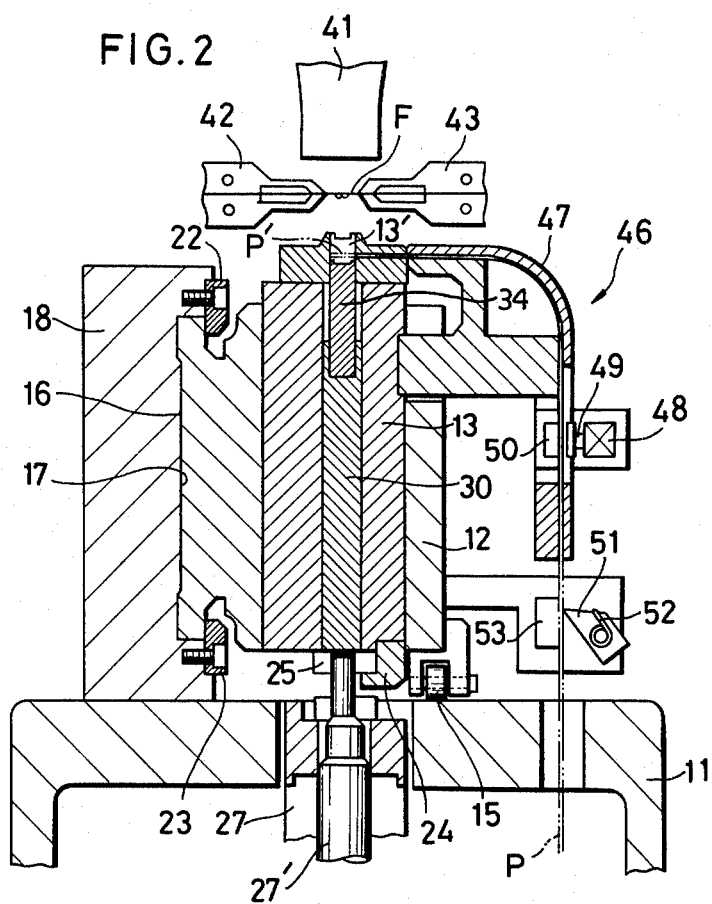
FIG. 2 is a cross-sectional view taken on the line II—II of FIG. 1.
Figure 3:
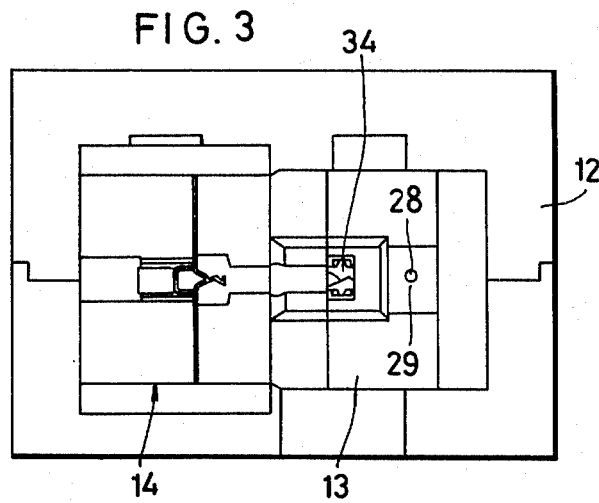
FIG. 3 is a plan view of a part of the apparatus of FIG. 1.

FIG. 1 shows a top end stop applying apparatus 10 according to the invention. The apparatus 10 includes a base 11 on which is mounted a housing 12 containing a shaping punch holder 13 and a seal-cut punch 14. As shown in FIG. 2, the housing 12 is movable horizontally, for which purpose the housing 12 has at the bottom a roller 15 rotative on and along the base 11, and further, has an elongated recess 16 in one of its side walls fitted with a complimentarily shaped protuberance 17 formed on a guide block 18 extending vertically from the base 11.

As shown in FIG. 1, a pneumatically actuated cylinder 19 is fixedly mounted on the base 11 and has its piston rod 20 connected to a rear-end wall 21 of the housing 12 to move the latter reciprocably along the guide block 18. A pair of retaining members 22,23 holds the housing 12 against the guide block 18.

Figure 6:
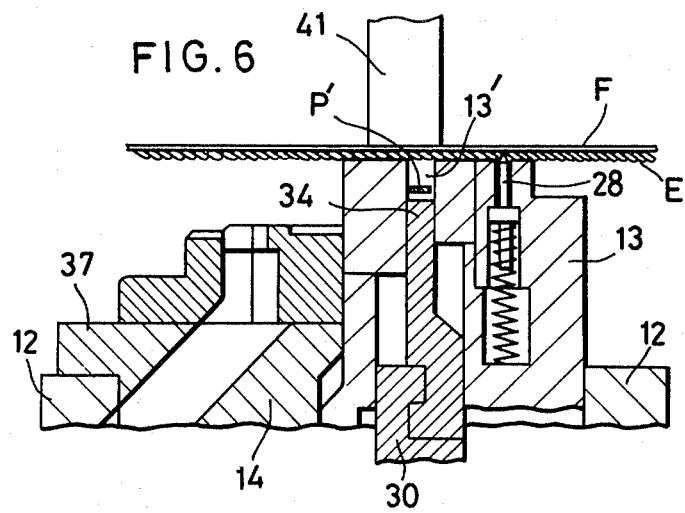
FIGS. 6 and 7 are enlarged cross-sectional, schematic views utilized to explain the operation of the apparatus according to the invention.
Figure 7:
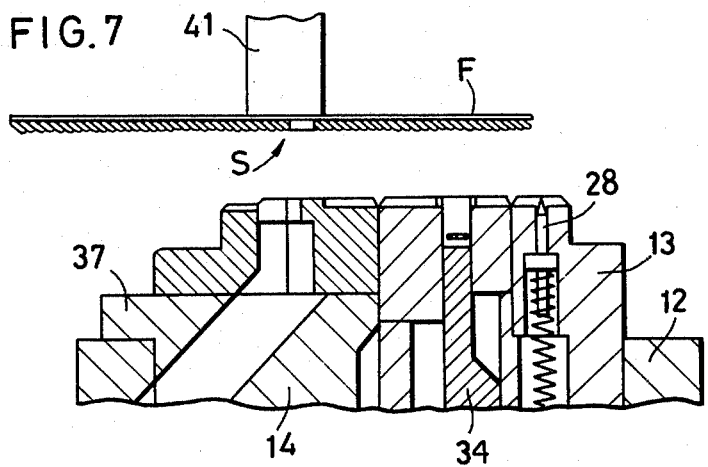

The shaping punch holder 13 has at the top with a film pocket 13' (FIGS. 2 and 6) receiving a leading end P' of top end stop forming film P, and at the bottom has a bracket member 24 holding a peripheral portion of a disc head 25 of a support member 26 (FIG. 1) fixedly mounted on an elevating block 27 which is vertically movable by means of an air cylinder not shown, but disposed in surrounding relation to an actuating rod 27'. The punch holder 13 contains a spring-biased positioning pin 28 adapted to project through an opening 29 into the path of a fastener stringer chain F.

The punch holder 13 accommodates therein a shaping punch 30 that is vertically movable and normally biased downwardly by a spring 31 but limited in its downward movement by means of a projection 32 disposed in a groove 33 formed vertically in the punch holder 13.

Figure 4:
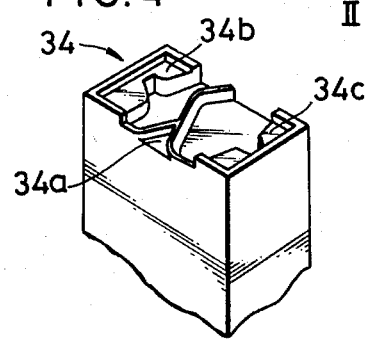
FIG. 4 is a perspective view of a shaping punch constituting a part of the apparatus of FIG. 1.

The top end stop shaping punch 30 has at its upper end a multi-shape mold 34 as shown in FIG. 4 which has a substantially Y-shaped ridge 34a and a pair of flat lands 34b, 34c on opposite sides of the ridge 34a.

Figure 5:
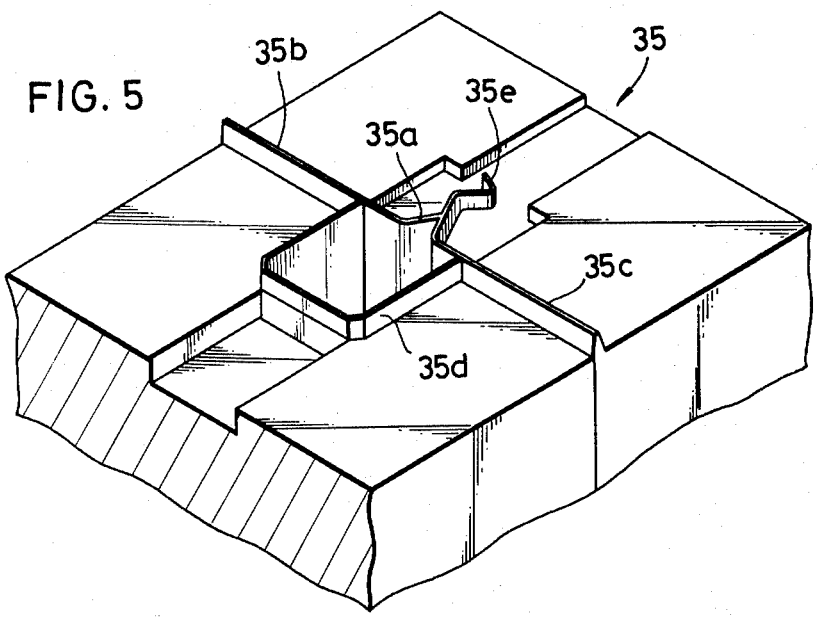
FIG. 5 is a perspective view of a seal-cut punch constituting a part of the apparatus of FIG. 1.
Figure 8:
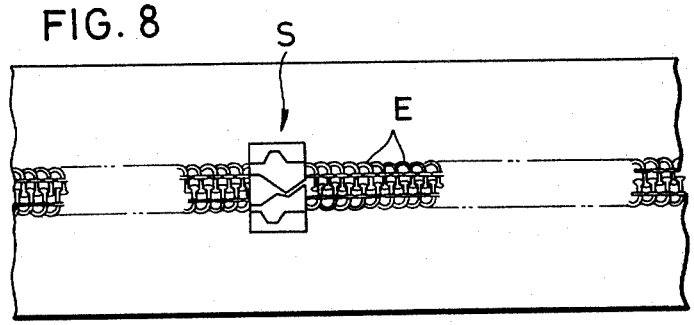
FIGS. 8 and 9, appearing with FIG. 5, are plan views of a portion of a fastener stringer chain which has been processed according to the invention.

The seal-cut punch 14 has, as shown in FIG. 5, at its upper surface, a multi-shape cutting blade 35 centrally having a Y-shaped portion 35a corresponding to the Y-shaped ridge 34a of the mold 34, a pair of linear portions 35b,35c transversely extending from the Y-shaped portion 35a and a substantially U-shaped portion 35d. A support bolt 14' (FIG. 1) is attached to the bottom of the punch 14 for purposes hereinafter described. The seal-cut punch 14 is normally biased downwardly by a tension spring 36, but is limited in its downward movement by a flange 37 engageable with the housing 12.

Located above the housing 12 are a clamping member 38 vertically movable to hold the stringer chain F against a pedestal 39 on the housing 12 during the top end stop applying operation, a stringer chain guide 40 for straightening the chain F prior to arrival at the working station W, and a supersonic horn 41 vertically movable and interposed between the clamping member 38 and the guide 40. A pair of grippers 42,43 (FIGS. 1 and 2) is positioned forwardly of the clamping member 38 and in horizontal alignment with the chain guide 40, and they function to grip the chain F and advance the same as predetermined distance. A pair of measuring rollers 44,45 is disposed adjacent to the chain guide 40 for rotation in response to the advancing movement of the chain F. The amount of rotation of the rollers 44,45 corresponds to the length of the chain F which has been advanced and is electrically detected by a suitable known means not shown.

As shown in FIG. 2, a film feed mechanism 46 is disposed at a location opposite to the guide block 18 for feeding the plastic film P to the top of the shaping punch 30. The film feed mechanism 46 includes an elongated film guide 47 secured to the punch holder 13, an electromagnet 48 and a plunger 49 operatively associated therewith. Energizing the magnet 48 actuates the plunger 49 to press the film P against a bearing block 50. A film reversal stopper 51 is provided below the magnet 48 for preventing the film P from moving backward, for which purpose the stopper 51 is urged normally counter-clockwise by a spring 52 to hold the film P against a bearing block 53.

During operation, the stringer chain F passes over a guide roll 54, between the measuring rollers 44,45 and through the chain guide 40. The chain F further passes between the working station W and the supersonic horn 41, thence between the clamping member 38 and the pedestal 39 and finally reaches the grippers 42,43. For purposes of illustration, a cycle of operation for applying top end stops to the stringer chain F begins with the actuation of the grippers 42,43 whereby the chain F is advanced a predetermined distance or length, whereupon the measuring rollers 44,45 are rotated for an amount corresponding to the length of the chain F that has been advanced. Completion of each of such predetermined chain advancement is electrically detected to send a signal to discontinue the movement of the grippers 42,43. This step is followed by ascending movement of the elevating block 27 thereby lifting the punch holder 13 to a position indicated by chain-dot lines in FIG. 1, in which position the positioning pin 28 enters between the fastener coupling elements E on the chain F (FIG. 6) and anchors the latter in place. Simultaneously with ascending of the punch holder 13, the electromagnet 48 is energized to move the plunger 49 against the bearing block 50, thereby clamping the film P. The film guide 47 ascends with ascending punch holder 13 to bring the clamped film up along with it. The leading end P' of the film P is located in the pocket 13' in the upper portion of the punch holder 13 and overlies the mold 34 of the shaping punch 30. The clamping member 38 descends and clamps the chain F against the pedestal 39 and a brake (not shown) is applied to lock the measuring rollers 44,45, whereupon the chain F is clamped in place between the rollers 44,45 and the clamping member 38 and thus held taut therebetween. The supersonic horn 41 then descends to the position of the chain F (FIG. 6), at which time a detecting signal is generated to actuate a cylinder not shown but linked to the rod 27' and thereby to lift the shaping punch 30 until the latter engages and cuts the strip of film P' that is received in the pocket 13'. The strip P' is then transferred to and urged by the mold 34 of the punch 30 against the coupled rows of elements E and is fused by oscillation of the horn 41 to the elements E and also the tapes T of the stringer chain. The film strip P' is thus fused and shaped into a form S identical with that of the mold 34 shown particularly in FIG. 4. Upon completion of the fusing and shaping steps, the horn 41 is de-energized and the rod 27' is lowered, and at the same time the punch 30 is lowered by the action of the spring 31, followed by descending of the elevating block 27 together with the punch holder 13. These movements bring the apparatus 10 back to the starting position shown in FIG. 1.

The film guide 47 descends with the punch holder 13, during which time the electromagnet 48 is de-energized to release the plunger 49 so that the film P is released but held by the stopper 51 so as not to move downwardly. As the film guide 47 descends, the next leading end P' of the film P is automatically introduced into the pocket 13' in the punch holder 13.

The next step in the cycle of operation beings with the actuation of the cylinder 19 so that the housing 12 is moved along the guide block 18 to the right as viewed in FIG. 1 until the cutting blade 35 of the seal-cut punch 14 comes into registry with the working station W where it underlies the horn 41. In this position, the support bolt 14' registers at its head with the actuating rod 27', with the disc head 25 carrying thereon the shaping punch 30. The horn 41 again starts oscillation and the rod 27' lifts the seal-cut punch 14 via bolt 14' until the blade 35 of the punch 14 reaches and cuts the preformed strip S and the tapes T along the multi-shape blade portions 35a, 35b, 35c and 35d shown in FIG. 5. The resulting top end stop is shown in FIG. 9 as attached to a tail end portion of the stringer chain F.

Figure 9:
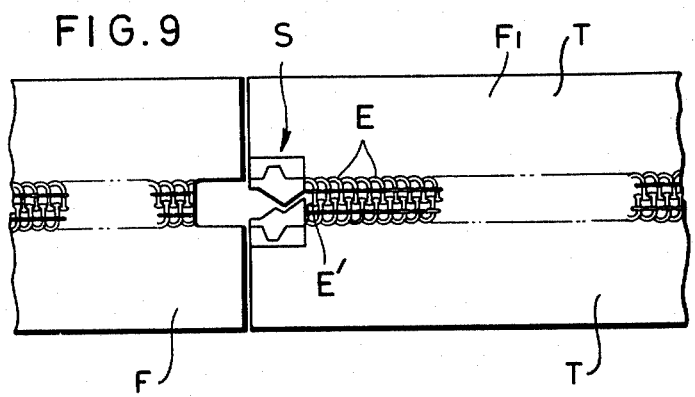

FIG. 9 also shows that a group of fastener elements E on a leading end portion of the next stringer chain has been removed by the U-shaped portion 35d of the blade 35. A close observation of FIG. 9 also shows that the endmost fastener element E' has been cut by an extension 35e of the Y-shape portion 35a so as to permit full separation of the coupled stringers.

As the cutting operation is completed, the horn 41 ascends and the seal-cut punch 14 retracts. The housing 12 is retracted to the initial position shown in FIG. 1. The clamping member 38 is released and so are the measuring rollers 44,45. The stringers F' that have been processed according to the invention may be forwarded to a further working station for the application thereon of a slider, a bottom end stop and other parts. The leading end of stringer chain F that has been severed from the processed stringers F' is again gripped by the grippers 42,43 in the manner shown in FIG. 2 to resume and repeat the above described cycle of operation.

Although various minor modifications may be suggested by those versed in the art, it should be understood that we wish to embody within the scope of the patent warrented hereon, all such embodiments as reasonably and properly come within the scope of our contribution to the art.

What is claimed is:

1. Apparatus for applying top end stops to a fastener stringer chain which comprises:
    (a) a base;
    (b) a housing mounted on said base and movable in a horizontal direction in which the chain is to travel;
    (c) a shaping punch holder movably accommodated within said housing and having a shaping punch movable relatively to said holder;
    (d) a seal-cut punch movably accommodated within said housing;
    (e) means for driving said holder, said shaping punch and said steel-cut punch relatively to each other;

(f) means for feeding a strip of plastic film to a working station;
(g) a supersonic horn disposed above the working station and operatively associated with said shaping punch and said seal-cut punch to apply said strip to the chain and to sever the applied strip, respectively;
(h) gripper means for advancing the chain a predetermined distance;
(i) a pair of measuring rollers passing the chain therebetween; and
(j) means for clamping the chain taughtly between said gripper means and said rollers.

2. Apparatus according to claim 1 wherein said shaping punch has a multi-shape mold and said seal-cut punch has a multi-shape cutting blade having a first portion corresponding in shape to said multi-shape mold, a second portion adapted to sever the chain transversely and a third portion adapted to provide a U-shaped recess in a succeeding chain.

3. Apparatus according to claim 1 wherein said feeding means includes a film guide member movable with said shaping punch holder, and a spring-biased stopper for preventing backward movement of the film strip.

4. Apparatus according to claim 1 wherein said shaping punch holder and said seal-cut punch are disposed in neighboring relation and are movable vertically relative to each other by means of the same driving means.

5. Apparatus according to claim 1, including means for supporting said housing movably on said base in said direction.

6. Apparatus according to claim 5, said supporting means comprising a roller rotatably mounted on the bottom of said housing and rotatable on said base, and a guide block mounted on said base and guiding said housing as the latter moves in said direction.

* * * * *